Nov. 7, 1967   J. R. SUITER   3,351,767
DEVICES RESPONSIVE TO THE ANGULAR POSITION OF A SHAFT
Filed April 13, 1964
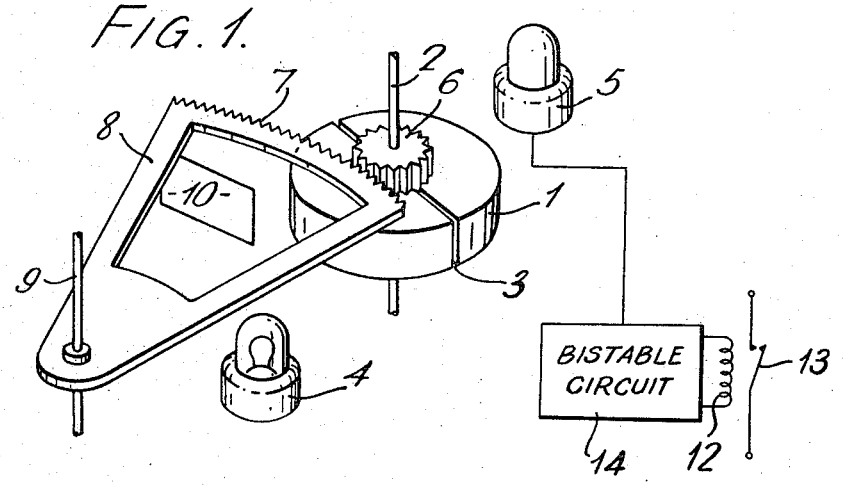
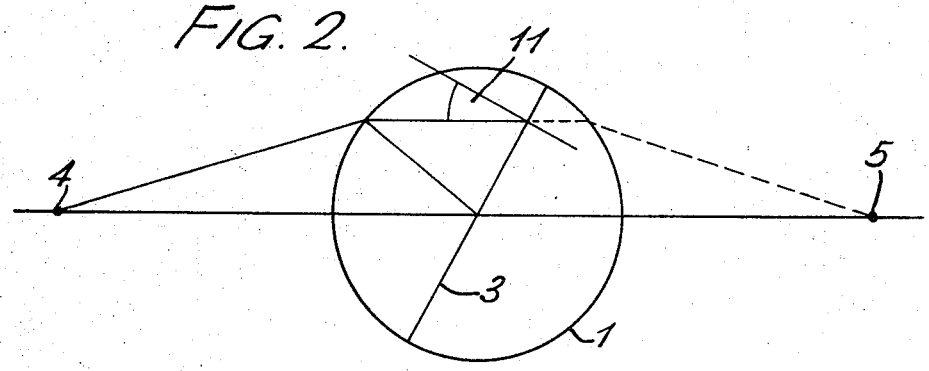
INVENTOR:
   JOHN ROSS SUITER
ATTORNEYS:
   Moore, Hall & Pollock United States Patent Office 3,351,767
Patented Nov. 7, 1967

3,351,767
DEVICES RESPONSIVE TO THE ANGULAR
POSITION OF A SHAFT
John Ross Suiter, Basingstoke, England, assignor to S.
Smith & Sons (England) Limited, London, England, a
British company
Filed Apr. 13, 1964, Ser. No. 359,313
Claims priority, application Great Britain, Apr. 11, 1963,
14,540/63
10 Claims. (Cl. 250—230)

ABSTRACT OF THE DISCLOSURE

A photocell receives light from a source, fixed in relation to the photocell, via a diametrically-split cylindrical prism that is mounted for rotation on the output shaft of an indicating instrument. When the prism is rotated by the shaft to a predetermined angular position, light within the prism strikes a wall of the split at the critical angle. With the prism rotated to (or beyond) this predetermined position, the photocell receives no light from the source.

This invention relates to devices responsive to the angular position of a shaft and is applicable, but not exclusively so, to devices responsive to the angular position of the shaft of an indicating instrument.

It is often a requirement that an indication should be given when the amplitude of a measured variable passes a preset level. It is, for example, sometimes a requirement that an indication should be given to the pilot of an aircraft when the aircraft exceeds a particular Mach number.

This may be achieved by providing a conventional indicating instrument, of the kind in which a shaft is rotated away from a datum angular position through an angle dependent on the magnitude of the measured variable, in conjunction with a device responsive to the angular position of the shaft which indicates when the angle through which the shaft has rotated exceeds a predetermined angle. The shaft may also, for example, drive a pointer which co-operates with a scale inscribed around a dial, or may drive any other indicating means.

A known device responsive to the angular position of a shaft which indicates when the angle through which the shaft has rotated has exceeded a predetermined angle, comprises a member attached to the shaft which operates a pair of contacts when the shaft has turned through the predetermined angle. However, the operation of the contacts imposes a mechanical load on the shaft in that angular position which is often undesirable.

It is an object of this invention to provide a device responsive to the angular position of a shaft which indicates when the angle through which the shaft has turned has exceeded a predetermined angle, but which does not impose a greater mechanical load on the shaft in one particular angular position than in other angular positions of the shaft.

According to this invention, a device responsive to the angular position of a shaft comprises a cylindrical member mounted coaxially on the shaft, the cylindrical member being constructed from a transparent material and having a slit whose walls are parallel to the axis of the shaft. A source of light, and means responsive to light, are disposed on opposite sides of the cylindrical member respectively so that light passes through the cylindrical member and is incident onto the means responsive to light if the angular position of the shaft is such that light from the source is incident onto a wall of the slit at an angle less than the critical angle at that wall.

The critical angle is normally that of the interface of the transparent material comprising the cylindrical member, and the ambient atmosphere. The slit may, however, be filled with a transparent substance so that the critical angle is that of the material of the cylindrical member and that filler substance.

If the light is incident on to the wall of the slit at an angle greater than the said critical angle, it is reflected and no light is incident onto the means responsive to light.

Preferably the line joining the source and the means responsive to light passes through the axis of the shaft.

Preferably the slit lies on a diameter of the cylindrical member.

The means responsive to light may comprise a photoelectric cell such as a photo-transistor or a photo-conductive resistor arranged to control a relay.

A device responsive to the angular position of a shaft and embodying this invention will now be described with reference to the accompanying drawings:

FIGURE 1 is a schematic representation of the device.

FIGURE 2 shows the path of a ray of light in the device.

A disc 1 constructed from a transparent polymethyl methacrylate such as that sold under the name "Perspex" is mounted on a shaft 2 of an instrument and has a diametral slit. The disc 1 may conveniently be constructed by clamping together two rectangular pieces of Perspex with a small gap between them and then turning the two pieces on a lathe. A lamp 4 and a photocell 5 are disposed on opposite sides of the apparatus and lie on a line passing through the shaft 2. The shaft 2 carries a pinion 6 which engages a sector of teeth 7 out on a quadrant 8, pivoted about a shaft 9 parallel to the shaft 2. The quadrant 8 carries a mask 10 which covers the lamp 4 when the shaft 2 has rotated through a predetermined angle from its datum position.

The photocell 5 is connected in a circuit which contains a relay, and the light incident on the cell 5 is arranged to control the operation of the relay. The relay is arranged to operate an indicating and/or warning device.

In use, in the datum position of the shaft 2, light from the lamp 4 is refracted at the entering edge of the disc 1 and is then incident onto a wall of the slit 3 at an angle of incidence 11 (FIGURE 2). The angle of incidence 11 is less than the critical angle of the material of the disc 1 and the ambient atmosphere, so that the light passes through the disc 1, is again refracted at the emergent edge of the disc 1 and is incident onto the cell 5. The disc 1 in this position acts as a converging lens focusing the light onto the cell 5.

When the shaft 2 is rotated in the anticlockwise direction (as seen in the drawings) so that the angle 11 exceeds the critical angle, light cannot pass through the disc 1 and no light is incident onto the cell 5. The relay is then operated. When the shaft 2 is rotated further, the mask 10 covers the lamp 4 so that when the slit 3 is in line with the lamp 4 and the cell 5 no light is incident onto the cell 5.

The device may be used in conjunction with a Mach meter of an aircraft to give an indication when the airspeed of the aircraft exceeds a predetermined Mach number, the shaft 2 then being rotated by a conventional Mach meter mechanism.

The cell 5 is a p-n-p phototransistor and forms with an n-p-n transistor a complementary bistable circuit 14, the circuit 14 being in one of its stable states when light is incident onto the cell 5 and in its other stable state when no light is incident onto the cell 5. The circuit in one of its states permits no current to flow through the energizing coil 12 of a relay but permits the flow of current through the coil 12 in its other stable state. When the coil 12 is not energized the relay contacts 13 are open, whereas when coil 12 is energized the relay contacts 13 are closed.

The bistable circuit may be so arranged that when light is incident onto the cell 5 the contacts 13 are open, or so that when no light is incident onto the cell 5 the contacts 13 are open.

Having thus described my invention, I claim:

1. A device responsive to the angular position of a shaft comprising a cylindrical member mounted coaxially on said shaft, said cylindrical member being constructed from a transparent material and having a slit whose walls are parallel to the axis of said shaft, a source of light, and means responsive to light, said source of light and said means responsive to light being disposed on opposite sides of said cylindrical member respectively so that light from said source passes through said cylindrical member and is incident onto said means responsive to light if the angular position of said shaft is such that light from said source is incident onto a wall of said slit at an angle less than the critical angle at that wall.

2. A device as claimed in claim 1 wherein said slit is filled with a transparent substance.

3. A device as claimed in claim 1 wherein said source and said means are positioned such that the line joining them passes through the axis of said shaft.

4. A device as claimed in claim 1 wherein said slit lies on a diameter of said cylindrical member.

5. A device as claimed in claim 1 including a member which is rotatably mounted about an axis parallel to the axis of said shaft, said member being mechanically connected to said shaft so that it rotates about the said axis as said shaft rotates about its axis, said member including means preventing light from said source from reaching said means responsive to light in predetermined angular positions of said shaft.

6. A device as claimed in claim 5 wherein said member comprises gear means which carries a mask and which meshes with further gear means carried by said shaft.

7. A device as claimed in claim 1 wherein said means responsive to light comprises photoelectric cell means.

8. A device as claimed in claim 7 wherein said photoelectric cell means comprises a phototransistor incorporated in a bistable circuit.

9. An indicating instrument for measuring the magnitude of a variable quantity, comprising a shaft the angular position of which is dependent on the magnitude of said quantity, and means responsive to the angular position of said shaft comprising a cylindrical light refracting member mounted coaxially on said shaft, said cylindrical member having a slit formed therein whose walls are parallel to the axis of said shaft, a source of light disposed adjacent one side of said cylindrical member, and means responsive to light disposed on the opposite side of said cylindrical member whereby light from said source passes through said cylindrical member and is incident onto said means responsive to light only when the angular position of said shaft is such that light from said source is incident onto a wall of said slit at an angle less than the critical angle at that wall.

10. A device responsive to the angular position of a shaft comprising a substantially solid generally cylindrical member mounted coaxially on said shaft for angular movement with said shaft, said cylindrical member comprising a light refracting material having spaced interior walls defining a slit extending at least partially across a diameter of said member, a source of light, and means responsive to light, said source of light and said light responsive means being disposed on diametrically opposite sides of said cylindrical member respectively at positions such that light from said source passes through said cylindrical member and is incident onto said light responsive means only when the light from said source is incident onto one of said interior walls at an angle less than the critical angle at that wall.

References Cited

UNITED STATES PATENTS

| | | | |
|---|---|---|---|
| 2,319,406 | 5/1943 | Jones | 250—231 X |
| 2,422,376 | 6/1947 | Turner et al. | 88—1 |
| 2,586,799 | 2/1952 | Elarde | 250—231 X |
| 2,601,806 | 7/1952 | Turner | 88—1 |
| 3,187,186 | 6/1965 | Martin | 250—231 |

OTHER REFERENCES

Harrick: "A Continuously Variable Optical Beam Splitter and Intensity Controller," Applied Optics, vol. 2, No. 11, November 1963, pp. 1203 to 1204.

RALPH G. NILSON, *Primary Examiner.*

ARCHIE R. BORCHELT, *Examiner.*

M. A. LEAVITT, *Assistant Examiner.*